US009164648B2

(12) United States Patent
Amendolagine et al.

(10) Patent No.: US 9,164,648 B2
(45) Date of Patent: Oct. 20, 2015

(54) METHOD AND APPARATUS FOR ESTABLISHING USER-SPECIFIC WINDOWS ON A MULTI-USER INTERACTIVE TABLE

(75) Inventors: James Amendolagine, San Marcos, CA (US); Nobukazu Sugiyama, San Diego, CA (US); Djung Nguyen, San Diego, CA (US)

(73) Assignee: Sony Corporation, Tokyo (JP)

( * ) Notice: Subject to any disclaimer, the term of this patent is extended or adjusted under 35 U.S.C. 154(b) by 605 days.

(21) Appl. No.: 13/238,006

(22) Filed: Sep. 21, 2011

(65) Prior Publication Data
US 2013/0073980 A1 Mar. 21, 2013

(51) Int. Cl.
G06F 3/048 (2013.01)
G06F 3/0481 (2013.01)

(52) U.S. Cl.
CPC .................... G06F 3/0481 (2013.01)

(58) Field of Classification Search
CPC ..................................................... G06F 3/0481
USPC ................................................. 715/751, 759
See application file for complete search history.

(56) References Cited

U.S. PATENT DOCUMENTS

| | | | |
|---|---|---|---|
| 5,561,811 A | 10/1996 | Bier | |
| 6,359,636 B1 | 3/2002 | Schindler et al. | |
| 6,384,840 B1 | 5/2002 | Frank et al. | |
| 6,415,257 B1 | 7/2002 | Junqua et al. | |
| 6,445,400 B1 | 9/2002 | Maddalozzo, Jr. et al. | |
| 6,894,703 B2 | 5/2005 | Vernier et al. | |
| 6,906,696 B2 | 6/2005 | Allport | |
| 7,730,425 B2 | 6/2010 | de los Reyes et al. | |
| 2001/0030644 A1 | 10/2001 | Allport | |
| 2003/0159071 A1 | 8/2003 | Martinez | |
| 2006/0097991 A1 | 5/2006 | Hotelling et al. | |
| 2007/0033539 A1 | 2/2007 | Thielman et al. | |
| 2007/0050845 A1 | 3/2007 | Das et al. | |
| 2007/0139395 A1 | 6/2007 | Westerman et al. | |
| 2007/0236330 A1 | 10/2007 | Cho et al. | |
| 2007/0266135 A1 | 11/2007 | Friedland et al. | |
| 2008/0289030 A1 | 11/2008 | Poplett | |
| 2009/0094561 A1* | 4/2009 | Do et al. ...................... 715/863 |
| 2009/0106667 A1* | 4/2009 | Lyle et al. ..................... 715/750 |
| 2009/0143141 A1 | 6/2009 | Wells et al. | |
| 2009/0206993 A1 | 8/2009 | Dimambro | |
| 2010/0053458 A1 | 3/2010 | Anglin et al. | |
| 2010/0083371 A1 | 4/2010 | Bennetts et al. | |
| 2010/0180210 A1 | 7/2010 | Toyama et al. | |
| 2011/0156867 A1 | 6/2011 | Carrizo et al. | |
| 2011/0197263 A1 | 8/2011 | Stinson, III | |

(Continued)

OTHER PUBLICATIONS

Final Office action from U.S. Appl. No. 13/105,766 mailed Jul. 16, 2013.

(Continued)

Primary Examiner — Andrea Leggett
(74) Attorney, Agent, or Firm — Fitch, Even, Tabin & Flannery LLP

(57) ABSTRACT

The present invention is directed toward a method and apparatus in which one or more user specific windows may be launched within a single computing session executed and displayed on the display of an interactive table. More specifically, the present invention is directed toward detecting the position of one or more users around an interactive table and generating one or more user-specific windows proximate to one or more user/s on the display of the interactive table within a single session.

21 Claims, 5 Drawing Sheets

(56) References Cited

U.S. PATENT DOCUMENTS

| | | |
|---|---|---|
| 2011/0231795 A1 | 9/2011 | Cheon et al. |
| 2012/0030289 A1 | 2/2012 | Buford et al. |
| 2012/0200391 A1 | 8/2012 | Sugiyama et al. |
| 2012/0204116 A1 | 8/2012 | Patil et al. |
| 2012/0204117 A1 | 8/2012 | Patil et al. |

OTHER PUBLICATIONS

Non-final office action from U.S. Appl. No. 13/238,017 mailed Apr. 3, 2013.

Non-final office action from U.S. Appl. No. 13/105,766 mailed Dec. 27, 2012.

Patil et al.; U.S. Appl. No. 61/439,317, filed Feb. 3, 2011.

Liu, Jiayang et al., "User Evaluation of Lightweight User Authentication with a Single Tri-Axis Accelerometer", MobileHCI'09 Bonn, Germany Sep. 15-18, 2009.

USPTO; Final Office Action issued in U.S. Appl. No. 13/238,017, mailed Oct. 1, 2013, (10 pgs).

Examiner Interview Summary for U.S. Appl. No. 13/105,766 mailed Sep. 4, 2013, (3 pgs.).

Non-final office action from U.S. Appl. No. 13/105,766 mailed Oct. 22, 2013, (17 pgs.).

USPTO; Advisory Action issued in U.S. Appl. No. 13/238,017, mailed Dec. 11, 2013, (3 pgs.).

Non-final office action from U.S. Appl. No. 13/238,017 mailed Feb. 3, 2014, (13 pgs.).

USPTO; Final Office Action issued in U.S. Appl. No. 13/105,766, mailed Apr. 23, 2014, 20 pages.

USPTO; Final Office Action issued in U.S. Appl. No. 13/238,017, mailed Jul. 3, 2014, 12 pages.

USPTO; Office Action issued in U.S. Appl. No. 13/238,017, mailed Nov. 4, 2014, 16 pages.

USPTO; Final Office Action issued in U.S. Appl. No. 13/238,017, mailed Jan. 27, 2015, 18 pages.

USPTO; Office Action issued in U.S. Appl. No. 13/105,766, mailed Apr. 21, 2015, 8 pages.

The Authoritative Dictionary of IEEE Standards Terms, 7th Ed., IEEE Press, Feb. 2007, p. 872.

\* cited by examiner

METHOD AND APPARATUS FOR ESTABLISHING USER-SPECIFIC WINDOWS ON A MULTI-USER INTERACTIVE TABLE

FIELD OF INVENTION

The present invention relates to a method and apparatus for displaying and manipulating personalized windows on a touch-screen based computing device. In particular, this invention involves a method and apparatus for running a multi-user computing session in which personalized windows for one or more user/s are displayed, at or near one or more detected user location/s.

BACKGROUND OF THE INVENTION

Computers have become an integral tool for collaboration. With the growing importance of computers as tools for collaboration, multi-user tabletops have been introduced to allow for a number of individuals collaborating to simultaneously view the subject of the collaboration at the same time. Larger screens have been introduced to offer the capability of allowing multiple people to interact to facilitate face-to-face collaboration, brainstorming, and decision-making.

The use of multi-user tabletops for establishing multiple simultaneous sessions (i.e., sessions running on separate threads) is addressed in U.S. Provisional Application No. 61/439,317, entitled "Ability to Share Screen for Multi-User Session on Sony Interactive Table", filed Feb. 3, 2011; and also in U.S. application Ser. No. 13/100,239, entitled "Method and Apparatus for a Multi-User Smart Display for Displaying Multiple Simultaneous Sessions", filed May 3, 2011, both of which are incorporated herein by reference.

SUMMARY OF THE INVENTION

Several embodiments of the invention advantageously address the needs above as well as other needs by providing a device comprising: a processor configured to perform steps comprising: establishing a session having a plurality of users; receiving a first-user window request from a first user of the plurality of users, wherein the first-user window request comprises a request to open one or more first user-specific windows; authenticating the first user in response to the first-user window request if the first user is not logged into the session; retrieving one or more window profiles corresponding with the one or more of the first user-specific windows; detecting a position of the first user; generating the one or more first user-specific windows at a location determined at least in part by the detected position of the first user, wherein the one or more first user-specific windows comprises one or more taskbars for managing the one or more first user-specific windows; and a display for simultaneously displaying the session, the session comprising the one or more first user-specific windows, wherein the appearance of the one or more first user-specific windows is based at least in part on the corresponding one or more window profiles.

In another embodiment, the invention can be characterized as a method comprising the steps of: establishing a session having a plurality of users; receiving a first-user window request from a first user of the plurality of users, wherein the first-user window request comprises a request to open one or more first user-specific windows; authenticating the first user in response to the first-user window request if the first user is not logged into the session; retrieving one or more window profiles corresponding with the one or more of the first user-specific windows; detecting a position of the first user; generating the one or more first user-specific windows at a location determined at least in part by the detected position of the first user, wherein the one or more first user-specific windows further comprises one or more taskbars for managing the one or more first user-specific windows; and displaying the session, the session comprising the one or more first user-specific windows, wherein the appearance of the one or more first user-specific windows is based at least in part on the corresponding one or more window profiles.

In yet another embodiment, the invention can be characterized as a tangible non-transitory computer readable medium storing one or more computer readable programs adapted to cause a processor based system to execute steps comprising: establishing a session having a plurality of users; receiving a first-user window request from a first user of the plurality of users, wherein the first-user window request comprises a request to open one or more first user-specific windows; authenticating the first user in response to the first-user window request if the first user is not logged into the session; retrieving one or more window profiles corresponding with the one or more of the first user-specific windows; detecting a position of the first user; generating the one or more first user-specific windows at a location determined at least in part by the detected position of the first user, wherein the one or more first user-specific windows comprises one or more taskbars for managing the one or more first user-specific windows; and displaying the session, the session comprising the one or more first user-specific windows, wherein the appearance of the one or more first user-specific windows is based at least in part on the corresponding one or more window profiles.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
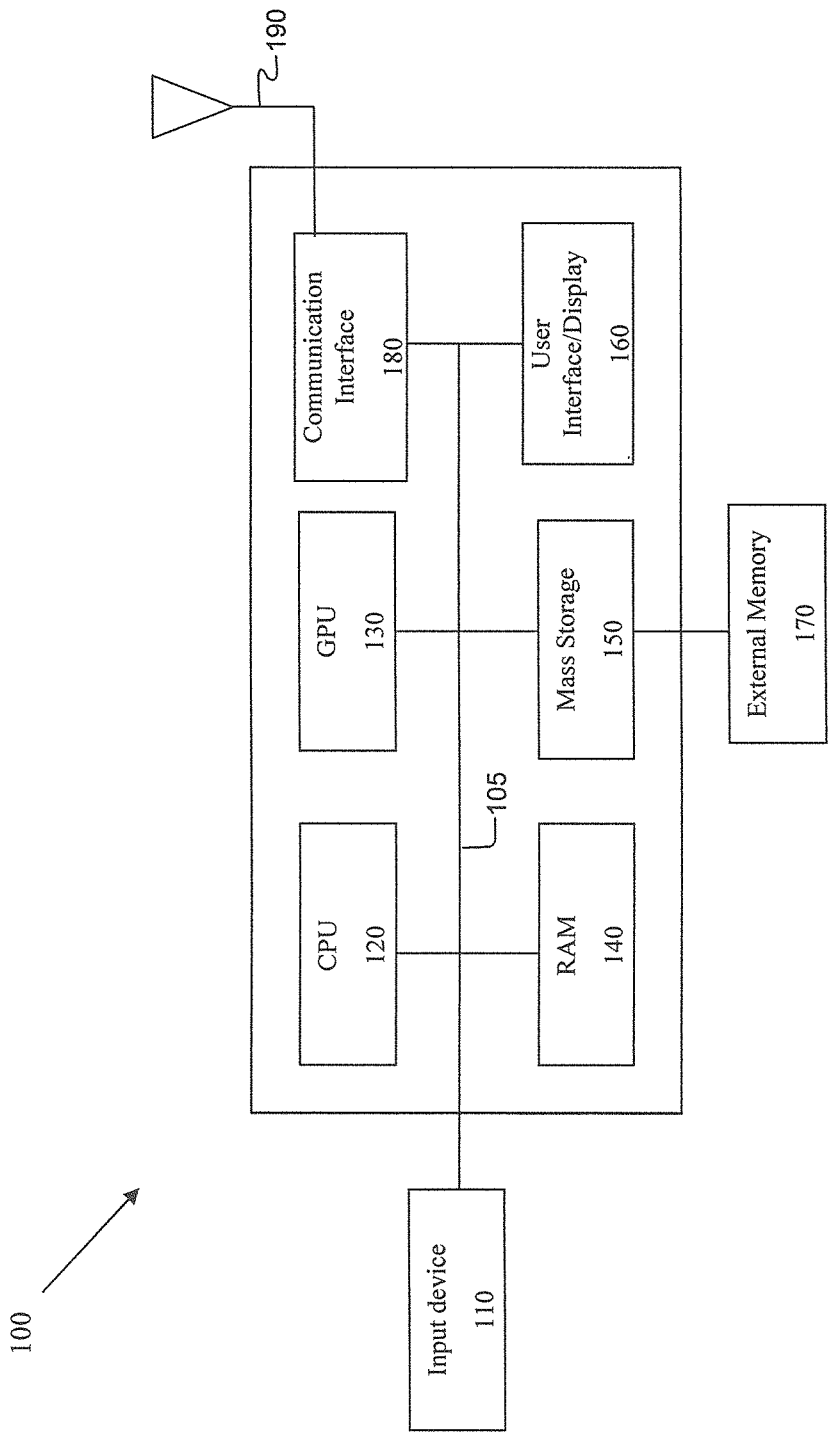
FIG. 1 is a block diagram illustrating a processor-based system that may be used to run, implement and/or execute the methods and/or techniques shown and described herein in accordance with embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also common but well-understood elements that are useful or necessary in a commercially feasible embodiment are often not depicted in order to facilitate a less obstructed view of these various embodiments of the present invention.

DETAILED DESCRIPTION

Reference will now be made in detail to certain embodiments of the present disclosure, examples of which are illustrated in the accompanying figures. It is to be understood that the figures and descriptions of the present disclosure illustrate and describe elements that are of particular relevance to the present disclosure, while eliminating, for the sake of clarity, other elements found in typical multi-user computer and/or graphical user interface (GUI) management systems. As such, the following descriptions are not to be taken in a limiting sense, but are made merely for the purpose of describing the general principles and exemplary embodiments of the instant invention. The scope of the invention should be determined with reference to the claims.

Furthermore, reference throughout this specification to "one embodiment," "an embodiment," or similar language means that a particular feature, method-step, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Typically, multi-user tabletops allow for a number of individuals collaborating to view the subject of the collaboration at the same time and offer the capability of allowing multiple people to interact facilitating face-to-face collaboration, brainstorming, and decision-making. However, while these tabletops allow for a single session accessible by all users, if a particular user wishes to access information within his/her own customized profile and/or with his/her own preferences, then the user will have to establish a separate and/or new private session such that the user may control the focus on his/her windows and/or widgets without interfering with the focus on tasks pertaining to another users. This would typically require that the user initiate a separate computing session, often on another processor based device using a separate monitor, etc.

In contrast, aspects of the present invention allow one or more users to simultaneously access multiple user specific windows within a single multi-user computing session. For example, in aspects of the present invention multiple focused user specific windows may be run together with multiple widgets such that each individual user may simultaneously interact with his/her own window/s and/or widget/s without interfering with the focus on the window/s and/or widget/s operated by another user.

According to several embodiments, the present invention provides a smart table having a large screen allowing users to play games or browse the web via a large flat screen table interface (e.g., horizontally oriented display). However, while the embodiments of the present invention are described below with respect to a flat screen table interface, one of ordinary skill in the art would appreciate that the methods and techniques described herein may be implemented irrespective of the shape and/or orientation of the display. For example, the methods and techniques described below may be implemented on a board type display (i.e., vertical orientation), on a semi spherical display, a spherical display, and/or other display devices.

In some preferred embodiments, the present invention enables different users to share the screen of an interactive table interface and interact with others through a single multi-user session serving a plurality of users, while simultaneously providing each user with one or more user specific windows by maintaining their own profile and login via a unique "login" pattern or identification. Thus the invention provides for screen sharing between multiple users having their own separate windows operated within the single multi-user session provided on the large screen of an interactive table.

In one embodiment, the invention provides a means for detecting the relative position of a user around the interactive table and authenticating the user via their unique login pattern. Once logged in, a task bar is presented to the user to enable the management of the user's one or more customized windows.

Referring to FIG. 1, which illustrates a system 100 for carrying out some embodiments of the invention; however as would be understood by one of skill in the art, the techniques described herein may be utilized, implemented and/or run on many different types of systems. However, as illustrated in FIG. 1, the system 100 comprises: a bus 105, an input device 110 (e.g. a keyboard, mouse, touch pad, game controller, a fingerprint sensor etc.), a central processing unit (CPU) 120, a graphics processing unit (GPU) 130, a random access memory (RAM) 140, a mass storage 150 (e.g., a tangible non-transitory memory device such as a disk drive or flash memory device etc.), an external memory 170, a user interface/user display such as a touch sensitive user interface/display 160, a communication interface 180 and an antenna 190.

The input device 110 of the system 100 may comprise essentially any input device, including but not limited to, traditionally computer input devices such as a keyboard, mouse, joystick, touch-pad, fingerprint sensor/s or detector/s, etc. The input device 110 may also optionally comprise one or more optical input device such as one or more camera/s and/or motion sensors, position sensors, and/or one or more sound detection devices such as a microphone, etc.

In some embodiments, the mass storage 150 may comprise any type of computer readable storage or recording medium. The computer readable storage medium may be fixed in the mass storage unit 150, or the mass storage unit 150 may optionally include external memory and/or removable storage media such as a digital video disk (DVD), Blu-ray disc, compact disk (CD) and/or a flash memory device such as a USB storage device or other tangible non-transitory memory device, etc. By way of example, the mass storage unit 150 and/or the external memory/removable memory device 170 may be used for storing code that implements the methods and techniques describe herein.

Thus, the external memory and/or removable storage media 170 may optionally be used with the mass storage unit 150 for storing code that implements the methods and techniques described herein, such as, for example, code for storing user-specific profile options and/or generating one or more user-specific windows for one or more of a plurality of users on the user interface/display 160.

The user interface/display 160 may comprise essentially any device for displaying information to a user. However, in some embodiments, the user interface/display 160 will comprise a touch screen device for both receiving input from and displaying information to one or more users.

In some embodiments of the invention, the communication interface 180 will comprise a communication port for establishing communication and exchanging information with one or more other processor-based systems. By way of example, the communication interface 180 may comprise one or more wired or wireless devices for transmitting and receiving information. In some embodiments, the communication interface 180 will comprise a wireless device and will use the antenna 190 for use in transmitting and receiving information from one or more other processor based systems or devices and/or one or more networks, such as the internet.

As illustrated, the input device 110, CPU 120, GPU 130, RAM 140, mass storage 150, user interface/display 160 and communication interface 180 are electrically coupled to the bus 105. Furthermore, as illustrated in FIG. 1, the external memory 170 is coupled directly to the mass storage 150; similarly, the antenna 190 is electrically coupled directly to the communications interface 180. However, in other embodiments, the components of the system 100 may be configured in a different topographic arrangement. Furthermore, any of the plurality of components of the system 100 may be interconnected using either wired or wireless communications.

In practice, one or more of the embodiments, methods, approaches and/or techniques described herein may be implemented in a computer program executable by a processor-based system, e.g., the system 100 illustrated by FIG. 1. By way of example, such processor based system may comprise the processor based system 100 comprising a processor (e.g. the CPU 120) or another processor-based system/device such as a television, a mobile device, tablet computing device, computer, entertainment system, game console, graphics workstation, etc. As such, one or more computer programs may be used for establishing a computing session for supporting a plurality of users and generating one or more user-specific windows, according to some embodiments of the invention, as will be further described below.

Figure 2:
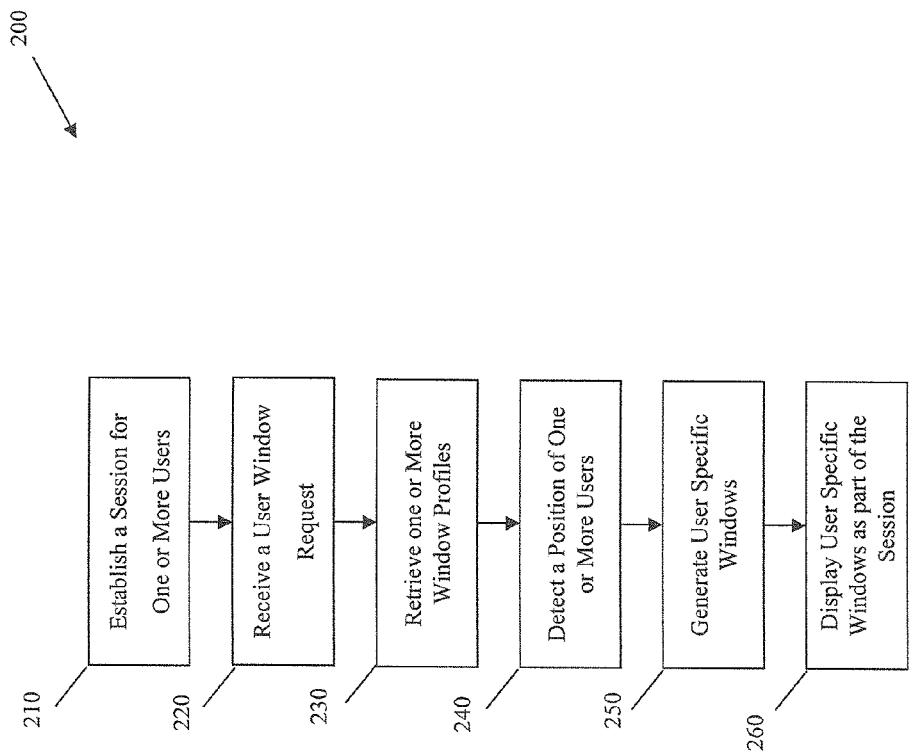
FIG. 2 is a flow diagram of a process for establishing a multi-user session for generating one or more user-specific windows at a detected user position.

FIG. 2 illustrates a flow diagram of a process for establishing a single multi-user session at an interactive table, according to several embodiments of the invention.

The process begins in step 210 wherein the system (e.g., the system 100 illustrated by FIG. 1) initiates one or more threads for establishing a multi-user session capable of supporting one or more users. According to some embodiments, the multi-user session may be generated on an interactive table, for example, on a display such as that of the user interface/display 160 illustrated in FIG. 1. In some embodiments, the multi-user session will be generated in response to an input received from one or more users; for example, the multi-user session may be initiated in response to a gesture or some equivalent user input detected as an indication that a user wishes to begin a multi-user session. By way of example, the gesture may comprise a touch pattern received by one or more input devices, such as the user interface/display 160 illustrated in the system 100 of FIG. 1. According to some embodiments, initialization of the multi-user session will further result in the launch of a general session window, using the one or more threads of the multi-user session.

In some embodiments, the general session window will be initially displayed on the interactive table in full screen mode, i.e., such that all users are able to interact with the session via the general session window. Furthermore, in some embodiments, the newly initialized session and corresponding general session window will comprise a desktop, one or more taskbar/s and/or desktop items based on appearance options stored within one or more general session profile/s. In some embodiments, the one or more taskbars provided within the general session window will enable one or more users to control one or more applications, items and/or windows, etc., within the general session window.

In some embodiments, the general session profile/s comprise appearance and settings similar to that of a user account profile in a traditional Personal Computer (PC) environment. By way of example, the general session profile may comprise, but is not limited to, information regarding the tools, software and display settings in the multi-user session's general session window.

In some embodiments, after the general session window is launched and placed into full-screen mode, the users interacting with the interactive table can provide one or more inputs that are received and displayed generally to all other users viewing the session. In one embodiment, the user inputs are performed at the location (or proximate to the location) where the active applications are running on the display of the interactive table (e.g. the user interface/display 160 of the system 100 depicted in FIG. 1).

Upon establishing the multi-user session in step 210, the process proceeds to step 220, wherein a user-specific window request is received from a user. Similar, to the session request discussed above with respect to step 210, the user's window request may be received via a gesture, voice command, login pattern or equivalent input detected as an indication that the user wishes to retrieve one or more user-specific windows. By way of example, the user-specific window request may be received from an input device (e.g. the input device 110 as illustrated in FIG. 1) and/or information received via a user interface or display (e.g. a touch screen of the interactive table such as the user interface/display 160 of FIG. 1). In some embodiments, the user-specific window request is generated when the user divides the screen of the interactive table, e.g., the user interface/display 160 of FIG. 1, with his/her fingers.

In step 230, user specific profile information pertaining to one (or more) user-specific window/s for the user is retrieved. By way of example, the user specific profile information may be retrieved by a processor (e.g. the CPU 120 of FIG. 1) from a memory or storage device, such as the mass storage 150. In some embodiments, the user profile information may comprise information pertaining to the visual appearance of one or more user-specific windows. By way of example, the user profile information may comprise information pertaining to window decorations, fonts, colors and/or the positioning of menus and icons. In some embodiments, the user profile information may comprise window management settings and/or preference that dictate the behavior of one or more user-specific windows and/or the behavior of the graphical user interface (GUI) within one or more user-specific windows.

In step 240, the user position is detected with respect to the user who made the user-specific window request of step 220. In some embodiments, the user's position may be detected based at least in part on the input method used to make the user-specific window request. If the user utilizes a touch based display to enter the user-specific window request in step 220 (e.g., via interaction with a user interface or user display such as the user interface/display 160 of FIG. 1) the user's relative position may be determined with respect to the location on the user interface/display 160 that is touched by the user. For example, the user-specific window request received (e.g., in step 220) may comprise a user drawing on or otherwise touching the user interface/display 160 such as drawing a box or window border on the user interface/display 160. Thus, the detected position of the user may correspond to the location touched by the user on the user interface/display 160.

In some embodiments, the user's relative position around the interactive table (e.g. an interactive table utilizing the system 100 of FIG. 1) may be determined based at least in part on information received from one or more microphones or optical input devices. By way of example, the user's relative position may be determined based on spatial information associated with the user's voice and/or based on information received from one or more optical sensing means such as one or more cameras and/or motion sensors.

In some embodiments, the user's position may be determined based at least in part on a particular location preference associated with that particular user. For example, a user may choose to always sit at the same location at the interactive table and thus may choose to save that particular location (with respect to the display of the interactive table, e.g. the user interface/display 160 of FIG. 1), as a preference. Upon receiving a particular user-specific window request, the system may determine that the user is in his/her preferred location.

Additionally, in some aspects of the invention, the user's position may be determined with reference to the known position of an input device (e.g., the input device 110 of the system 100). By way of example, if the input device 110 comprises one or more fingerprint sensor/s positioned at the corners of an interactive table, then the user's position may be determined to be at a location with respect to the known position of a particular sensor, for example, adjacent to the location of a given fingerprint sensor. Thus, when a user logs into the system using a particular fingerprint sensor and/or makes a user-specific window request from a particular fingerprint sensor, the user's location may be determined to be at a predetermined location relative to (e.g., adjacent to) the fingerprint sensor.

In some embodiments, when the user position is determined, the system detects and/or reserves a portion of the display proximate to the detected user position for use in displaying one or more user-specific windows, as will be explained in greater detail, below.

Next, in step 250, the system generates one or more user specific windows wherein the one or more user specific windows each comprise at least a portion of the user's specific profile information retrieved in step 240. By way of example the one or more user specific windows may be generated such that the one or more user specific windows contain distinguishing graphical aspects such as colors, images, window decorations, or symbols such as the user's name that are unique to, or identify a particular user. By way of further example, the one or more user specific windows may be generated such that the window management and/or behavior of the one or more user specific windows will be unique to a particular user.

In some embodiments, one or more taskbars will be generated with the one or more user specific windows, for use in controlling the one or more user specific windows. In some embodiments, the remaining portions of the screen will be displaying one or more general session windows.

In step 260, the generated one or more user specific windows are displayed within the multi-user session. In some embodiments, the one or more displayed user specific windows will be displayed at a location on the screen nearest the user associated with the one or more user specific windows. By way of example, the one or more user specific windows may be displayed at a location on the display (e.g., the user interface/display 160 of FIG. 1) based on the user position determined in step 240, as discussed above. By way of example, the determination of the user's position may be based at least in part on the location of a fingerprint sensor (e.g., input device 110 of the system 100) that is used by the user. For example, the fingerprint sensor may be located at the side of an interactive table; when a user swipes his/her finger, the one or more user specific windows will be displayed on a portion of the display that is nearest to the fingerprint sensor.

In some embodiments, the user's location or position information may be determined based on a gesture made by the user (e.g., a gesture made at or near the table that is picked up by an optical input device such as a camera or a motion sensor, etc.). Thus, when a user makes a gesture, the user's location/position information will be used to display the one or more user specific windows on a portion of the display that is nearest to the user.

Figure 3:
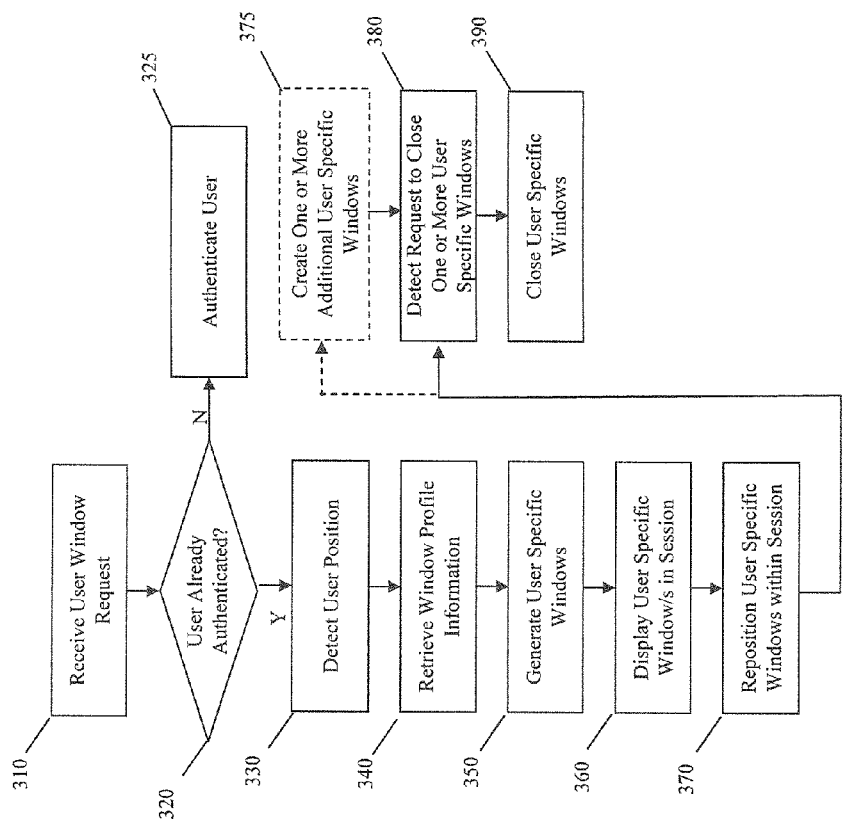
FIG. 3 is a flow diagram of a process authenticating a user and generating and displaying one or more user specific windows at the smart table, according to several embodiments of the present invention.

FIG. 3 is a flow diagram of a process for authenticating a user and generating and displaying one or more user specific windows at an interactive table, according to several embodiments of the invention. The process begins with step 310 in which the interactive table (e.g., an interactive table comprising a system such as the system 100 of FIG. 1) receives a user window request from a user. In some embodiments, the user's window request may be received from an input device such as a mouse or keyboard. In some embodiments, similar to the session request discussed above with respected to step 210, the user's window request may be received via a gesture, voice command, login pattern or some equivalent input detected as an indication that the user wishes to retrieve one or more user-specific windows. By way of example, the user-specific window request may be received from an input device (e.g. the input device 110 as illustrated in FIG. 1) and/or information received via a user interface or display (e.g., a touch pattern received via a touch screen of the interactive table such as the user interface/display 160 of FIG. 1).

In step 320, the user's authentication/login status is determined, i.e., the interactive table (e.g., an interactive table comprising a system such as the system 100 discussed above) determines whether the user making the window request is currently logged onto the system.

If it is determined that a particular user is not yet logged onto the multi-user session, the process proceeds to step 325 in which the user is authenticated. In this manner a second user may be added to the session; however, as would be appreciated by those of skill in the art, essentially any numbers of users may be supported by the session.

Furthermore, actual user authentication may occur using essentially any combination of user inputs, including but not limited to: a username and/or password combination entered at an input device such as a keyboard or mouse, one or more gestures and/or touch patterns received via an optical input device or a touch screen (e.g., the user interface/display 160 of FIG. 1), fingerprint information collected from one or more fingerprint readers or scanners, etc. In some embodiments, upon providing verifiable login credentials, the user will be logged into the multi-user session running on the interactive table.

Alternatively, if it is determined that the user is already logged into the multi-user session, the process will proceed to step 330 in which the user's position will be determined In step 330 the user's position is detected. In some embodiments, the user's position may be determined based at least in part on information received from the user's window request (step 310) or authentication (step 320), discussed above. For example, the user's window request may involve the user drawing on and/or touching a display of the interactive table (e.g., the user interface/display 160 of FIG. 1). By way of further example, the user's position may be determined based at least in part on information received from any of the means discussed above with respect to step 240 in FIG. 2, including, but not limited to one or more keyboards, computer mouse, touch screens, microphones and/or optical input devices, etc. In some embodiments, the user's position around the interactive table may be determined with respect to information received from one or more optical input devices such as one or more camera/s and/or motion sensors or position sensors, etc.

By way of example, the user's position may be determined with respect to one or more images of the user.

In step 340, one or more window profiles are retrieved in response to the user-specific window request. In some embodiments, the user profile information may comprise information pertaining to the visual appearance of one or more user-specific windows (e.g., the user profile information may comprise information pertaining to fonts, themes, skins, colors and/or the placement/positioning of menus and icons). In some embodiments, the user profile information may comprise window management settings and/or preferences that dictate the behavior of one or more user-specific windows and/or the behavior of the graphical user interface (GUI) within one or more user-specific windows. For example, the user profile information may contain information regarding the placement and size of one or more icons or windows. In some aspects, the user profile information may contain data pertaining to thematically related appearance options such as information defining stylistic skins or themes, etc.

In step 350, one or more user specific windows are generated, based at least in part on the window profile information retrieved in step 340, above. In some embodiments, the generated one or more user-specific windows will comprise unique and/or personal graphical attributes such as colors, window decorations, symbols and/or names etc., that are associated with a particular user.

In step 360, the one or more user specific windows generated in step 350 will be displayed on a display of the interactive table (e.g., the user interface/display 160 of FIG. 1). In some embodiments, the displayed one or more user specific windows will be produced on the display of the interactive table at a location that is proximate to the user authenticated in step 320, above. For example, the one or more user specific windows may be displayed at a location proximate to the associated user based on the user's position/location information determined in step 330. In some embodiments, the displayed one or more user-specific windows will be displayed at a location that is determined by the user's personal window profile information; for example, at a location chosen by the user and stored in the user's profile/setting information, retrieved in step 340, above. In some embodiments, the position of the displayed one or more user specific windows will depend, at least in part, on the locations of one or more user specific windows, associated with other users currently logged onto the same multi-user session.

In step 370 one or more of the user specific windows being displayed in the multi user session may be repositioned on the display of the interactive table. By way of example, a user associated with one or more of the user specific windows being displayed in the multi-user session may be able to select one or more of his/her windows to share with one or more other users. For example, one or more of a user's windows may be shared with other users for use in collaborating and/or sharing data or application resources that are running within one or more of the user specific windows. In some embodiments, a user's specific windows may be shared with one or more other users by duplicating the window/s and/or repositioning the window/s to different locations around the display of the interactive table. As will be discussed in further detail below, in some embodiments, one or more user specific windows may be shared between multiple users by simply dragging the window or application to a portion of the display that is accessible to other users.

In optional step 375, one or more additional user specific windows may be created for a particular user (i.e., a second-user) that has already been authenticated (see step 320, above). By way of example, the user may create one or more additional user specific windows, as discussed above in steps 350 through 370.

In step 380, the interactive table (e.g., the system 100 of FIG. 1, above receives a request to close one or more of the displayed user specific windows. In some embodiments, the request to close one or more of the displayed user specific windows will be received via a gesture made by the user (e.g., a gesture made on the user interface/display 160 of FIG. 1, above). However, in other embodiments the request to close the one or more user specific windows may be received through any combination of inputs received from the user. By way of example, the request may be received via one or more gestures, voice commands and/or mouse/keyboard actions performed by the user, etc.

Figure 4:
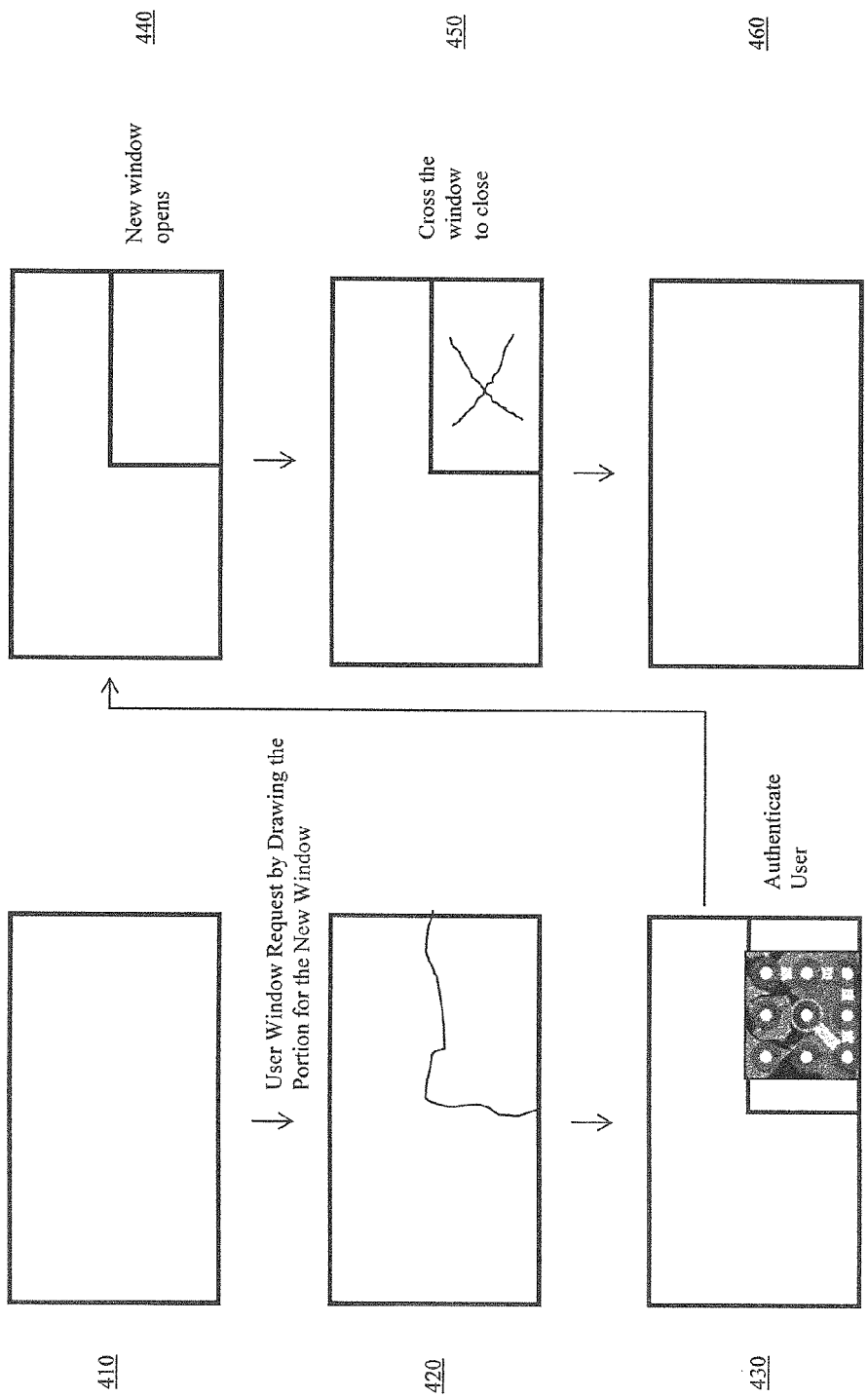
FIG. 4 illustrates exemplary screen shots of the table throughout the process of establishing one or more user-specific windows within a multi-user session, according to several embodiments of the present invention.

FIG. 4 illustrates exemplary screen shots of the interactive table while the process of creating a user specific window is performed. Screen shot 410 shows the screen of the interactive table before any user specific windows have been opened/created. In some embodiments, in this stage a multi-user session may be in progress, however no user specific windows have yet been generated and displayed.

Screen shot 420 shows the screen of the interactive table (e.g., the user interface/display 160 of the system 100) when a user initiates the process of creating a user specific window according to some embodiments of the invention. In this embodiment, the user initiates a window request (e.g., similar to that of step 310, discussed above) by drawing a line with his/her fingers at a corner of the interactive table screen. As discussed above, other gestures and/or inputs may be used in other embodiments to begin this process. By way of example, the window request may be initiated when a user divides the interface/display 160 with his or her fingers.

Next, in screen shot 430, the table depicts a user specific window placed proximate to the lines drawn by the user and provides means by which the user identification and/or verification may occur (e.g., see step 320 and 325, discussed above).

As shown in screen shot 440, once the user is identified, verified and/or authenticated, the user specific window opens within the multi user session, allowing the user to interact with the user specific window. In some embodiments of the invention, one or more taskbars will be displayed to the user for use in controlling the one or more user specific windows.

In some embodiments, multiple users may open and use one or more windows within the same session. By way of example, a first user may open and interact with one or more of his/her personal user-specific windows within a session running on the processor based device. Simultaneously, a second user may also open and interact with one or more of his/her user-specific windows in the same session. As such, each user may be performing a different task, e.g., playing games or browsing the web on the same flat screen table interface. In some embodiments, when the second user closes his/her windows, the display may display one large screen again for the first user.

The user may then choose to terminate/close the user specific window (e.g., as discussed above with respect to step 390 in FIG. 3). As shown in screen shot 450, the user may make a gesture to close the user specific window e.g., by touching the display of the interactive table. Once the request to terminate the session is received, the system closes the session.

Next, as shown in screen shot 460, the display of the interactive table is in full screen mode, allowing one or more users to interact with the multi-user session in progress. While in this exemplary embodiment, only one user specific window is displayed, it should be understood by one of ordinary skill in the art that each of a plurality of users of the smart table may initiate their own user specific windows at a location within the same multi-user session supported by the smart table.

Figure 5:
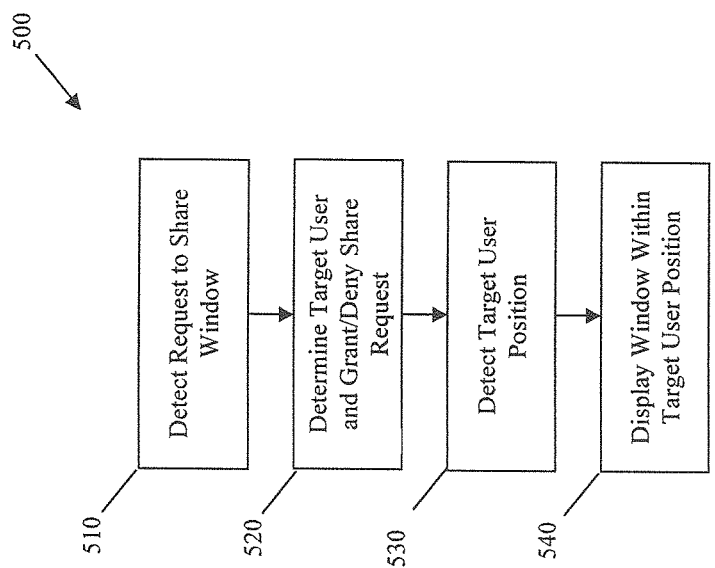
FIG. 5 is a simplified flow diagram of a method for detecting the position of a collaborator and repositioning one or more user-specific windows for use in collaboration between two or more users.

Referring next to FIG. 5, a process 500 for sharing one or more user specific windows between two or more users logged into the multi-user session of the interactive table is illustrated. The process begins with step 510 in which a user receives a request (from a target user) to share one or more of the user's user-specific windows. In some embodiments, the request may be displayed within the user's one or more user specific windows. In some embodiments, the request may be displayed external to one or more of the user's user specific windows; for example, the request may be displayed in one or more of the general session windows that are run (and displayed) within the multi-user session of the interactive table.

Upon receiving the share request, the process proceeds to step 520 in which the target user is determined and the request to share the one or more user specific windows is either granted or denied for that user. If the window share request is granted, the process proceeds to step 530 in which the target user's position is determined. By way of example, the target user's position may be determined using any of the means discussed above with respect to step 240 of the process 200 and/or step 330 of the process 300. That is, in some embodiments, the target user's position may be determined based at least in part on the target user's profile and/or preference information and/or position information received from one or more input devices such as a keyboard, mouse, joystick, touch-pad, fingerprint sensors or detector, optical input device (e.g., cameras, motions sensors), etc.

Once the target user's position has been determined, the process proceeds to step 540 in which one or more of the user's user-specific windows are shared with one or more target users by displaying the one or more shared windows at a location on the display that is proximate to the one or more target users' location.

While the invention herein disclosed has been described by means of specific embodiments, examples and applications thereof, numerous modifications and variations could be made thereto by those skilled in the art without departing from the scope of the invention set forth below, in the claims.

The invention claimed is:

1. A device comprising:
   a processor configured to perform steps comprising:
      establishing a session having a plurality of users, each of the plurality of users sharing the same display area of the session;
      receiving a first-user window request from a first user of the plurality of users, wherein the first-user window request comprises a request to open one or more first user-specific windows within the session display area;
      authenticating the first user in response to the first-user window request if the first user is not logged into the session;
      retrieving one or more window profiles corresponding with one or more of the first user-specific windows;
      detecting a position of the first user, wherein the position of the first user is determined at least based in part on a gesture performed by the first user;
      generating the one or more of the first user-specific windows at one or more first locations determined at least in part by a detected position of the first user, wherein one or more of the first user-specific windows comprises one or more taskbars for managing one or more of the first user-specific windows; and
   a display for displaying the session, the session comprising one or more of the first user-specific windows, wherein an appearance of one or more of the first user-specific windows is based at least in part on one or more corresponding window profiles;
   wherein the entire display area of the multi-user session that accepts user input is configured to receive input from each of the plurality of users.

2. The device of claim 1, wherein the processor is further configured to perform the steps of:
   receiving a second-user window request from a second user of the plurality of users, wherein the second-user window request comprises a request to open one or more second user-specific windows;
   authenticating the second user in response to the second-user window request if the second user is not logged into the session;
   retrieving one or more of the second window profiles corresponding with the one or more of the second user-specific windows;
   detecting a position of the second user;
   generating one or more of the second user-specific windows at one or more second locations determined at least in part by a detected position of the second user, wherein one or more of the second user-specific windows comprises one or more taskbars for managing one or more of the second user-specific windows; and
   simultaneously displaying one or more of the second user-specific windows together with one or more of the first user-specific windows, wherein an appearance of one or more of the second user-specific windows is based at least in part on one or more corresponding second window profiles.

3. The device of claim 2, wherein the processor is further configured to perform the step of:
   repositioning one or more of the second user-specific windows to one or more new locations selected by the second user.

4. The device of claim 1, wherein the processor is further configured to perform the step of:
   repositioning one or more of the first user-specific windows to a chosen location selected by one of the plurality of users.

5. The device of claim 1, wherein the processor is further configured to perform the step of:
   sharing one or more of the first user-specific windows with two or more of the plurality of users.

6. The device of claim 1, wherein the processor is further configured to perform the step of:
   retrieving one or more window profiles corresponding with one or more of the first user-specific windows based at least in part on fingerprint information received from a fingerprint sensor.

7. The device of claim 6, wherein the position of the first user is determined at least in part on the fingerprint information received from the fingerprint sensor.

8. The device of claim 1, wherein the processor is further configured to perform the step of:
   displaying an additional first user-specific window in the session in response to the first user dividing the display with his/her fingers.

9. The device of claim 1, wherein the position of the first user is determined at least based in part on a recognition of a first user's voice.

10. The device of claim 1, wherein the position of the first user is determined at least based in part on a detected image.

11. The device of claim 1, wherein the position of the first user is determined at least based in part on a recognition of a first user's voice.

12. The device of claim 1, wherein the position of the first user is determined at least based in part on a detected image.

13. A method comprising:
establishing a session having a plurality of users, each of the plurality of users sharing the same display area of the session;
receiving a first-user window request from a first user of the plurality of users, wherein the first-user window request comprises a request to open one or more first user-specific windows;
authenticating the first user in response to the first-user window request if the first user is not logged into the session;
retrieving one or more window profiles corresponding with the one or more of the first user-specific windows within the session display area;
detecting a position of the first user, wherein the position of the first user is determined at least based in part on a gesture performed by the first user;
generating the one or more first user-specific windows at one or more locations determined at least in part by the detected position of the first user, wherein one or more of the first user-specific windows further comprises one or more taskbars for managing the one or more first user-specific windows; and
displaying the session, the session comprising one or more of the first user-specific windows, wherein an appearance of one or more of the first user-specific windows is based at least in part on one or more corresponding window profiles;
wherein the entire display area of the multi-user session that accepts user input is configured to receive input from each of the plurality of users.

14. The method of claim 13, further comprising:
receiving a second-user window request from a second user of the plurality of users, wherein the second-user window request comprises a request to open one or more second user-specific windows;
authenticating the second user in response to the second-user window request if the second user is not logged into the session;
retrieving one or more second window profiles corresponding with one or more of the second user-specific windows;
detecting a position of the second user;
generating one or more of the second user-specific windows at one or more second locations determined at least in part by the detected position of the second user, wherein one or more of the second user-specific windows comprises one or more taskbars for managing one or more of the second user-specific windows; and
simultaneously displaying one or more of the second user-specific windows together with one or more of the first user-specific windows, wherein an appearance of one or more of the second user-specific windows is based at least in part on one or more corresponding second window profiles.

15. The method of claim 14, further comprising:
repositioning one or more of the second user-specific windows to a new location selected by the second user.

16. The method of claim 13, further comprising:
repositioning one or more of the first user-specific windows to a new location selected by one of the plurality of users.

17. The method of claim 13, further comprising:
sharing one or more of the first user-specific windows with two or more of the plurality of users.

18. The method of claim 13, further comprising:
retrieving one or more window profiles corresponding with one or more of the first user-specific windows based at least in part on fingerprint information received from a fingerprint sensor.

19. The method of claim 18, wherein the position of the first user is determined at least in part on the fingerprint information received from the fingerprint sensor.

20. The method of claim 13, further comprising:
displaying an additional first user-specific window in the session in response to the first user dividing the display with his/her fingers.

21. A tangible non-transitory computer readable medium storing one or more computer readable programs adapted to cause a processor based system to execute steps comprising:
establishing a session having a plurality of users, each of the plurality of users sharing the same display area of the session;
receiving a first-user window request from a first user of the plurality of users, wherein the first-user window request comprises a request to open one or more first user-specific windows within in the session display area;
authenticating the first user in response to the first-user window request if the first user is not logged into the session;
retrieving one or more window profiles corresponding with one or more of the first user-specific windows;
detecting a position of the first user, wherein the position of the first user is determined at least based in part on a gesture performed by the first user;
generating one or more of the first user-specific windows at one or more first locations determined at least in part by the detected position of the first user, wherein one or more of the first user-specific windows comprises one or more taskbars for managing one or more of the first user-specific windows; and
displaying the session, the session comprising one or more of the first user-specific windows,
wherein an appearance of one or more of the first user-specific windows is based at least in part on one or more corresponding window profiles;
wherein the entire display area of the multi-user session that accepts user input is configured to receive input from each of the plurality of users.

* * * * *

UNITED STATES PATENT AND TRADEMARK OFFICE
CERTIFICATE OF CORRECTION

| | | |
|---|---|---|
| PATENT NO. | : 9,164,648 B2 | |
| APPLICATION NO. | : 13/238006 | |
| DATED | : October 20, 2015 | |
| INVENTOR(S) | : Amendolagine et al. | |

It is certified that error appears in the above-identified patent and that said Letters Patent is hereby corrected as shown below:

In the CLAIMS:
Claim 21, column 14, line 34, delete "within in" and insert --within--.

Signed and Sealed this
Eighth Day of March, 2016

Michelle K. Lee
*Director of the United States Patent and Trademark Office*